United States Patent [19]
Hashimoto et al.

[11] Patent Number: 5,973,880
[45] Date of Patent: Oct. 26, 1999

[54] NEGATIVE PRESSURE FLYING HEAD SLIDER HAVING IMPROVED SIDE RAILS CONSTRUCTION

[75] Inventors: Kiyoshi Hashimoto; Masaaki Matsumoto; Hidekazu Kohira; Yasuo Kojima; Shinji Yonemura, all of Odawara, Japan

[73] Assignee: Hitachi, Ltd., Tokyo, Japan

[21] Appl. No.: 08/976,101

[22] Filed: Nov. 21, 1997

[30] Foreign Application Priority Data

Nov. 25, 1996 [JP] Japan .................................. 8-313588

[51] Int. Cl.$^6$ ........................................ G11B 5/60
[52] U.S. Cl. ............................................. 360/103
[58] Field of Search ............................................. 360/103

[56] References Cited

U.S. PATENT DOCUMENTS

| Re. 35,800 | 5/1998 | Chapin | 360/103 |
|---|---|---|---|
| 5,430,591 | 7/1995 | Takeuchi et al. | |
| 5,515,219 | 5/1996 | Ihrke | 360/103 |
| 5,704,715 | 1/1998 | Chang | 360/103 |
| 5,721,650 | 2/1998 | Crane | 360/103 |

FOREIGN PATENT DOCUMENTS

| 6-223525 | 12/1994 | Japan . |
|---|---|---|
| 7-111054 | 4/1995 | Japan . |
| 7-169221 | 7/1995 | Japan . |

*Primary Examiner*—A. J. Heinz
*Attorney, Agent, or Firm*—Fay, Sharpe, Beall, Fagan, Minnich & McKee

[57] ABSTRACT

A negative pressure flying head slider includes an air bearing surface of a substantially rectangular shape disposed in opposed relation to a rotating magnetic disk. One side rail of the slider is adapted to be located at an outer periphery-side of the magnetic disk when the slider is mounted on a magnetic disk device, and has an inflow-side side rail portion which is disposed at an air inflow end-side of the slider, extending generally parallel to the longitudinal direction of the slider, and an outflow-side side rail portion which is disposed at an air outflow end-side of the slider, extending in a direction of a yaw angle. The angle of the outflow-side side rail portion with respect to the inflow-side side rail portion is greater than the maximum value of an absolute value of the yaw angle. The slider further includes a recess defined by a cross rail and the side rails, and a slit formed in the cross rail to permit the recess to communicate with the air inflow end of the slider. A magnetic transducer is provided at that portion of the slider disposed adjacent to the air outflow end of the slider.

21 Claims, 7 Drawing Sheets

NEGATIVE PRESSURE FLYING HEAD SLIDER HAVING IMPROVED SIDE RAILS CONSTRUCTION

BACKGROUND OF THE INVENTION

This invention relates to a flying head slider and a magnetic disk device using the same, and more particularly to a negative pressure flying head slider suitable for a magnetic disk device of a high recording density, and also to a magnetic disk device using the same.

Recently, there has been a demand for magnetic disk devices capable of achieving a higher recording density than before. In a magnetic disk device, there is used a flying head slider which flies while keeping a microscopic distance in relation to a rotating magnetic disk. The flying height can be kept constant at any position over the magnetic disk, and therefore negative pressure flying head sliders, proposed for example in U.S. Pat. No. 5,430,591 and Japanese Patent Unexamined Publication No. 7-169221, have been extensively used.

To attain a high recording density, it is sufficient to make the flying height small. Therefore, the inventors of the present invention have used negative pressure flying head sliders, such as those proposed in U.S. Pat. No. 5,430,591 and Japanese Patent Unexamined Publication No. 7-169221, with a flying height of several tens of nm, and as a result the following problems have been encountered.

In the negative pressure flying head slider such as that proposed in U.S. Pat. No. 5,430,591, it is possible to make the flying height small, but air stagnation appears at that portion (where side rails are not provided) of the slider to the rear of the side rails, so that a lubricant is accumulated on this portion. In a contact.start.stop (CSS) type in which the flying head slider is brought into sliding contact with the magnetic disk when the device is activated (started) and stopped, the lubricant is coated uniformly thin over the entire surface of the magnetic disk in order to enhance the sliding properties. The lubricant has a high viscosity at first, but in accordance with the rotation of the magnetic disk, the lubricant is lowered in viscosity, and floats in a mist-like manner over the magnetic disk. This has not generated any problem when the flying height is as large as 200 nm as in the conventional construction. However, in the case where the flying height is several tens of nm in order to achieve a high recording density, the slider flies at a region where the mist of the lubricant is thick, and therefore it is thought that the lubricant is accumulated on that portion of the slider where the air is stagnant. When the slider, having the lubricant accumulated thereon, is left on the magnetic disk upon stop of the device, the lubricant intrudes between the slider and the magnetic disk, and forms a meniscus, thereby producing a large adhesion force. This adhesion force increases the force to firmly hold the slider on the magnetic disk, and therefore there is a possibility that the magnetic disk device cannot be activated again, and in the worst case a suspension supporting the slider is plastically deformed, thus making it difficult to obtain the optimum flying height, so that a trouble such as a clash of the slider may occur.

On the other hand, in the negative pressure flying head slider such as that disclosed in Japanese Patent Unexamined Publication No. 7-169221, there is no portion to the rear of the side rails where side rails are not provided, and therefore a lubricant will not accumulate on any portion of the slider. However, when the direction of flow of the air into an air bearing surface of the slider becomes out of agreement with the longitudinal axis of the slider (in other words, a yaw angle is formed) due to a seeking operation of the slider, the air obliquely traverses the rails, and therefore a sufficient pressure, produced by the compression of the air, is not obtained at the rail portions, so that the flying height is reduced. Particularly during the seeking operation, the angle at which the air obliquely traverses the rails, increases, so that the flying height is remarkably reduced. The reduction of the flying height upon formation of the yaw angle and during the seeking operation has not caused any problem when the flying height is as large as 200 nm as is conventional. However, in the case where the flying height is several tens of nm in order to achieve a high recording density, there is a possibility that the slider crashes with the magnetic disk upon formation of the yaw angle and during the seeking operation.

SUMMARY OF THE INVENTION

It is an object of this invention to provide a negative pressure flying head slider in which the flying height can be reduced to several tens of nm without causing the accumulation of a lubricant, and the reduction of the flying height upon formation of a yaw angle and during a seeking operation is small, thereby eliminating a possibility that the slider collides with a magnetic disk.

Another object is to provide a magnetic disk device of a high recording density using such a negative pressure flying head slider.

According to the present invention, there is provided a negative pressure flying head slider comprising: an air bearing surface of a substantially rectangular shape to be disposed in opposed relation to a rotating magnetic disk; an air inflow end; an air outflow end; an air introducing portion formed on the air bearing surface in immediately adjacent relation to the air inflow end; a cross rail formed on the air bearing surface in continuous relation to the air introducing portion, the cross rail extending in a direction of a width of the slider; a pair of side rails formed on the air bearing surface, and extending respectively from opposite ends of the cross rail to the air outflow end in a longitudinal direction of the slider, one of the pair of side rails being adapted to be located at an outer periphery-side of the magnetic disk when the slider is mounted on a magnetic disk device, the one side rail having an inflow-side side rail portion which is disposed at an air inflow end-side of the slider, and extends generally parallel to long sides in the longitudinal direction of the slider, and an outflow-side side rail portion which is disposed at an air outflow end-side of the slider, and extends in a direction of a yaw angle, and an angle of the outflow-side side rail portion with respect to the inflow-side side rail portion being more than a maximum value of an absolute value of the yaw angle; a recess defined by the cross rail and the pair of side rails; a slit formed in the cross rail to permit the recess to communicate with the air inflow end; and a magnetic transducer provided at that portion of the slider disposed in the vicinity of the air outflow end.

In one form of the invention, the other of the pair of side rails is adapted to be located at an inner periphery-side of the magnetic disk when the slider is mounted on the magnetic disk device, and the other side rail has an inflow-side side rail portion which is disposed at the air inflow end-side of the slider, and extends generally parallel to the long sides in the longitudinal direction of the slider, and an outflow-side side rail portion which is disposed at the air outflow end-side of the slider, and extends in the direction of the yaw angle, and an angle of the outflow-side side rail portion of the other side rail with respect to the inflow-side side rail portion thereof is more than a maximum value of an absolute value of the yaw angle.

In the one form of the invention, the outflow-side side rail portion of the one side rail and the outflow-side side rail portion of the other side rail extend substantially in the same direction.

In another form of the invention, the outflow-side side rail portion of the one side rail and the outflow-side side rail portion of the other side rail extend in such a manner that they approach each other progressively toward the air outflow end.

Preferably, the inflow-side side rail portion and the outflow-side side rail portion are substantially equal in length to each other.

The slit is provided in a central portion of the slider in a widthwise direction of the slider. Alternatively, the slit is offset from the central portion of the slider in the widthwise direction of the slider.

According to another aspect of the invention, there is provided a magnetic disk device comprising: a rotatable spindle for rotating a magnetic disk; and a rotary actuator comprising a pivotally-movable carriage, a suspension mounted on a distal end of the carriage, and a novel negative pressure flying head slider constructed according to any of the preferred embodiments disclosed herein.

DESCRIPTION OF THE PREFERRED EMBODIMENTS

A first embodiment of a negative pressure flying head slider of the present invention will now be described with reference to FIGS. 1 to 5.

Figure 1:
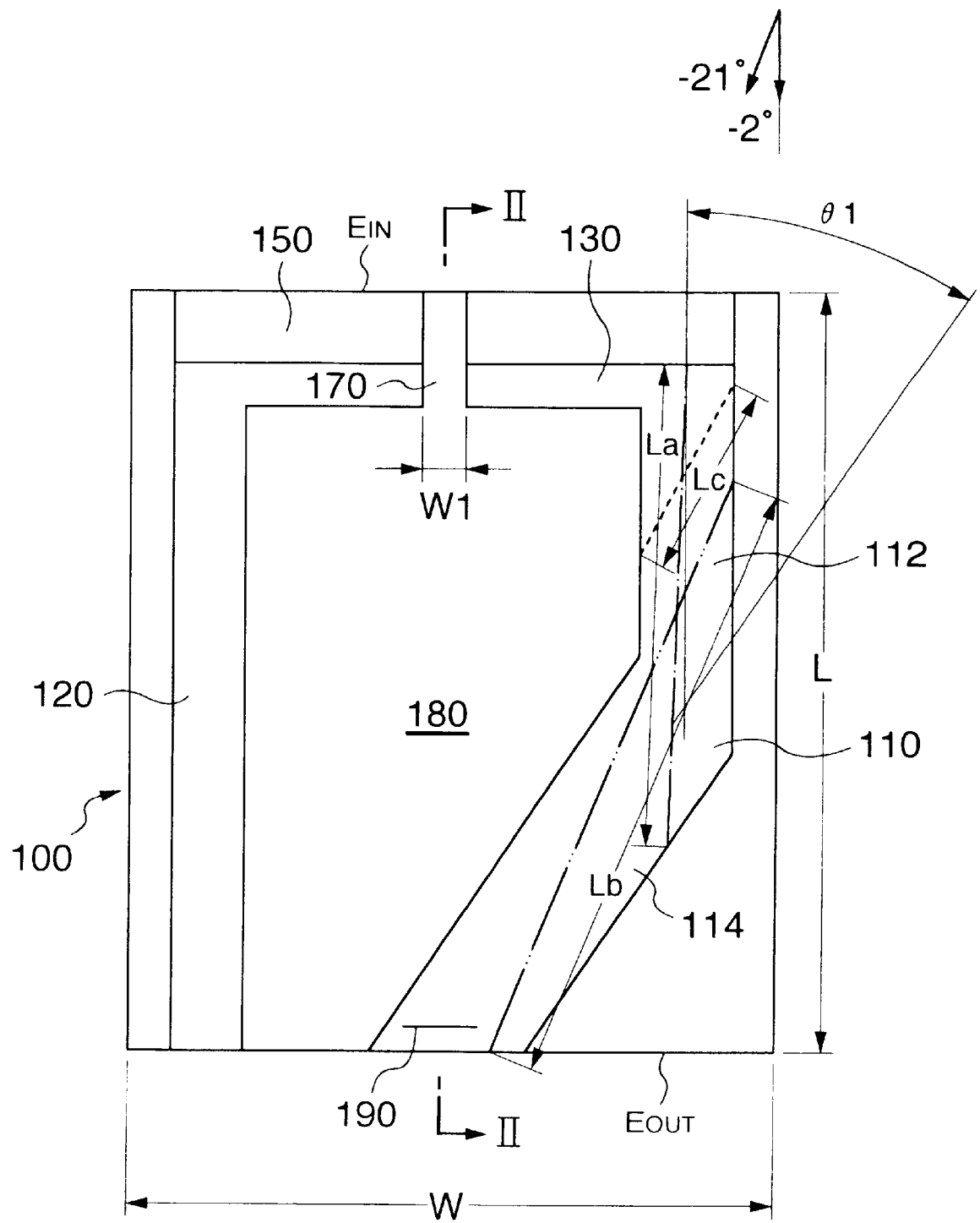
FIG. 1 is a plan view of a first embodiment of a negative pressure flying head slider of the present invention, showing an air bearing surface.

A surface, shown in FIG. 1, is an air bearing surface of the slider 100 to be opposed to a magnetic disk.

The slider 100 has an air inflow end Ein defined by one longitudinal end thereof, and an air outflow end Eout defined by the other end. A flow of the air, produced in accordance with the rotation of the magnetic disk, is directed from the air inflow end Ein toward the air outflow end Eout.

In this embodiment, the slider 100 has a length L of 1.25 mm, a width W of 1.0 mm and a thickness T of 0.3 mm.

A pair of side rails 110 and 120, a cross rail 130, an air introducing portion 150, and a slit 170 are formed at the air bearing surface of the slider 100.

Figure 2:
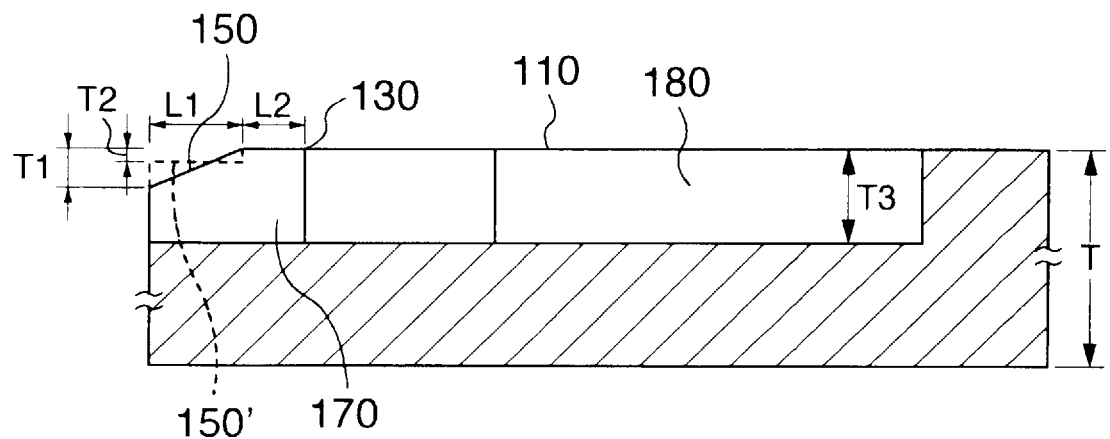
FIG. 2 is a cross-sectional view taken along the line II—II of FIG. 1.

The air introducing portion 150 is provided immediately adjacent to the air inflow end Ein, and extends in the direction of the width of the slider 100. The air introducing portion 150 is formed by a slanting surface as shown in FIG. 2 which shows its cross-section. A height T1 of that side of the air introducing portion 150, disposed at the air inflow end Ein, is 1.83 $\mu$m, and its length L1 in the longitudinal direction is 0.15 mm. Therefore, the angle of inclination of the slanting surface is about 0.7°, and a microscopic gradient is formed. The air introducing portion 150 serves to introduce the air between the slider 100 and the magnetic disk. The air introducing portion 150, formed by the slanting surface, may be replaced by an air introduction portion 150' of a stepped configuration as indicated in a broken line in FIG. 2, in which case a height T2 of this step is 0.7 $\mu$m.

The cross rail 130 for producing a negative pressure is formed in continuous relation to the air introducing portion 150. A width L2 of the cross rail 130 is 0.09 mm. The slit 170 is provided to divide the air introducing portion 150, as well as the cross rail 130, into two equal portions. A width W1 of the slit 170 is 0.08 mm.

The side rails 110 and 120 are formed adjacent respectively to longitudinal opposite sides of the slider 100, and extend from the cross rail 130 in the longitudinal direction of the slider 100. The side rails 110 and 120 extend to the air outflow end Eout. The side rail 110, when opposed to the magnetic disk, is located at an outer periphery-side (i.e., an outer peripheral portion) of the magnetic disk, and the side rail 120, when opposed to the magnetic disk, is located at an inner periphery-side (i.e., an inner peripheral portion) of the magnetic disk. The side rail 110, located at the outer periphery-side, comprises an inflow-side side rail portion 112 which is disposed at an air inflow end-side (i.e., that portion of the slider disposed close to the air inflow end Ein) of the slider 100, and is parallel to the long sides in the longitudinal direction of the slider 100, and an outflow-side side rail portion 114 which is disposed at an air outflow end-side (i.e., that portion of the slider disposed close to the air outflow end Eout) of the slider 100, and is inclined inwardly toward the centerline or axis of the slider 100. On the other hand, the side rail 120 is provided parallel to the long sides in the longitudinal direction of the slider 100.

The angle θ1 of the outflow-side side rail portion 114 with respect to the longitudinal direction (longitudinal axis) of the slider 100 is 32°.

A recess 180 in the air bearing surface of the slider 100 is formed in that region surrounded by the side rails 110 and 120 and the cross rail 130. A depth T3 of the recess 180 is 5 μm.

A magnetic transducer 190 for recording and reproducing information relative to the magnetic disk is provided at that portion of the side rail 110 disposed near to the air outflow end Eout. Although the magnetic transducer 190 is provided at one side rail 110, such magnetic transducers may be provided respectively at both of the side rails 110 and 120, or the magnetic transducer may be provided at that portion of the side rail 120 disposed near to the air outflow end Eout.

The side rails 110 and 120, the cross rail 130, the slit 170, and the recess 180 (formed inside these rails), which are formed at the air bearing surface of the slider 100, are formed by ion milling, etching or any other suitable process.

Figure 3:
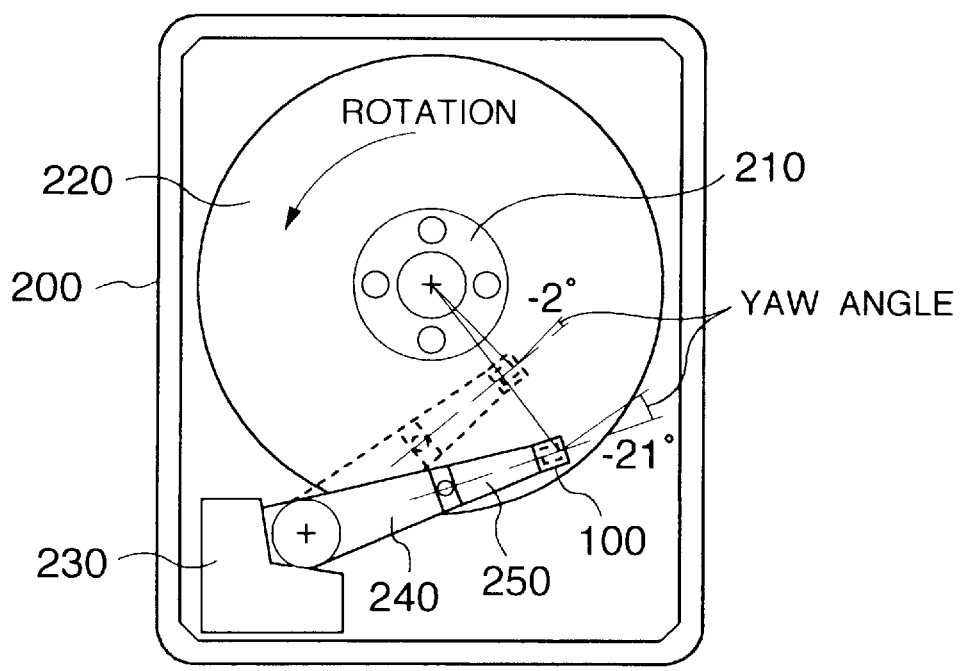
FIG. 3 is a schematic plan view of a magnetic disk device in which the slider of the first embodiment is mounted.
Figure 4:
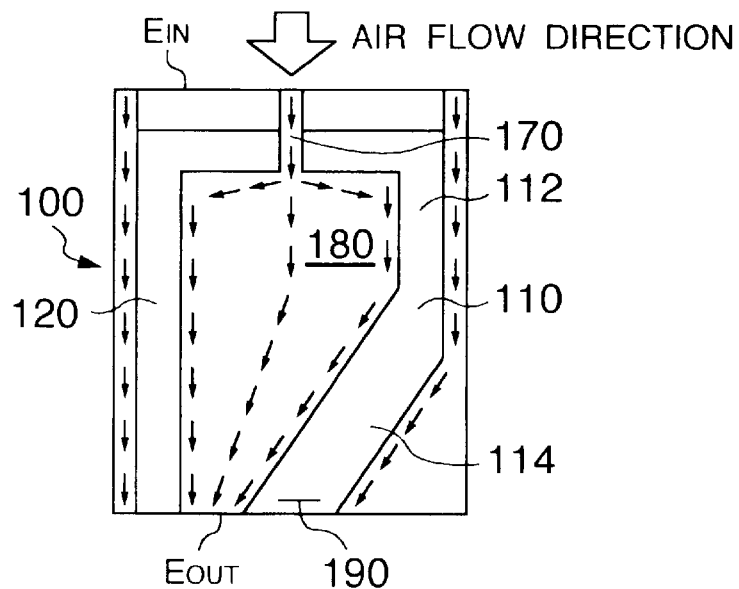
FIG. 4 is a view showing flows of the air over the air bearing surface of the slider of the first embodiment, with the air flows over a cross rail and side rails omitted.

The negative pressure flying head slider is mounted in a magnetic disk device as shown in FIG. 3.

The 3.5-inch magnetic disk device 200 comprises a magnetic disk 220 mounted on a spindle 210 for rotation at a speed of 7,200 rpm, and a rotary actuator 230.

The rotary actuator 230 comprises a pivotally-movable carriage 240, a suspension 250 mounted on a distal end of the carriage 240, and the negative pressure flying head slider 100 mounted on a distal end of the suspension 250.

The negative pressure flying head slider 100 is so mounted on the distal end of the suspension 250 that the air bearing surface, having the side rails and so on (shown in FIG. 1) formed thereon, is opposed to the magnetic disk 220.

When the magnetic disk 220 rotates at a speed of 7,200 rpm, an air flow is produced in a direction of the circumference of the magnetic disk 220. The rotary actuator 230, having the negative pressure flying head slider 100 mounted thereon, effects a swinging (pivotal) motion so that the slider 100 can be positioned on a desired one of a plurality of tracks formed on the magnetic disk 220 from its inner periphery to its outer periphery. As a result of this swinging motion of the rotary actuator 230, the direction of the air, flowing between the slider 100 and the magnetic disk 220, varies. The angle between the air flow direction and the longitudinal direction (longitudinal axis) of the slider 100 is referred to as the "yaw angle". The sign of the yaw angle, obtained when the air flows from the inner periphery-side of the magnetic disk 220 with respect to the longitudinal direction of the slider 100, is represented by a positive sign. In the magnetic disk device 200 shown in FIG. 3, the yaw angle varies in the range of from about −2° to about −21°.

The slider 100 is pressed against the magnetic disk 220 with a force of 1.5 gf by the suspension 250. When an air flow, produced by the rotation of the magnetic disk 220, intrudes between the slider 100 and the magnetic disk 220, the slider 100 flies with a distance (flying height) of several tens of nm over the magnetic disk 200.

The slider 100 is precisely positioned at an arbitrary radial position of about 20 to 46 mm on the magnetic disk 220 by the rotary actuator 230. By the magnetic transducer 190 provided either at that portion of the disk outer periphery-side side rail 110 disposed adjacent to the air outflow end Eout or at that portion of the disk inner periphery-side side rail 120 disposed adjacent to the air outflow end Eout, information is recorded and reproduced relative to the magnetic disk 220.

Next, the flow of the air on the air bearing surface of the slider will be described. The air, introduced into the air introducing portion 150, is compressed by this air introducing portion 150, and is increased in pressure. Part of an air stream, blowing past the cross rail 130, advances over the side rails 110 and 120 to produce a positive pressure, and flows to the outflow end Eout, and part of this air stream is expanded in the recess 180 to produce a pressure (negative pressure) lower than the ambient pressure, and flows to the outflow end Eout. An air stream, introduced through the slit 170, advances directly into the recess 180 without being increased in pressure, and serves to decrease the negative pressure produced in the recess 180, and flows to the outflow end Eout without causing stagnancy of the air stream.

In the type of slider (as disclosed in U.S. Pat. No. 5,430,591) in which the distal ends of the side rails do not extend to the air outflow end of the slider, a portion where the air flow is stagnant is formed between the distal ends of the side rails and the air outflow end of the slider. As a result, a lubricant, coated on the magnetic disk, is accumulated on this air flow-stagnant portion.

On the other hand, in this embodiment, as described above, the side rails 110 and 120 extend to the air outflow end Eout of the slider 100, and therefore the air flow will not be stagnant, and a lubricant on the magnetic disk will not be accumulated on the slider 100.

Experimentation has been effected with the following conditions. The magnetic disk device 200 shown in FIG. 3 was used. A lubricant layer of about 20 Å (angstrom) in thickness was coated on the 3.5-inch magnetic disk 220. The magnetic disk was rotated at a speed of 7,200 rpm. After the slider 100 was caused to fly for 6 hours in a radial position of 45 mm at a position of yaw angle 0°, the slider 100 was left on another magnetic disk for one hour, and then an adhesion force was measured.

As a conventional negative pressure flying head slider, there was used the type of slider in which a pair of side rails, formed respectively at opposite side portions of the slider, were parallel to a longitudinal direction of the slider, and did not extend to an air outflow end of the slider. In the conventional negative pressure flying head slider, a maximum adhesion force of 30 gf was produced since the lubricant was accumulated on that portion (where the side rails were not present) of the slider to the rear of the side rails.

On the other hand, a maximum adhesion force, obtained when using the negative pressure flying head slider 100 of FIG. 1, was 2 gf since the lubricant was not accumulated on the slider. This adhesion force is less than 1/10 of that produced in the conventional negative pressure flying head slider.

Next, the relation between the flying height and the yaw angle in this embodiment will be described.

In this embodiment, as described above, the yaw angle varies in the range from −2° to −21°. The flying height is determined by the length of the side rails along the direction of the air flow, that is, the length of compression of the air by the side rails. Therefore, the longer the side rails are, the larger the flying height is.

Now, consider the case where the absolute value of the yaw angle is small (for example, the yaw angle is −2°. A length La, indicated in a dot-and-dash line in FIG. 1, corresponds to the length of compression of the air by the side rail 110. Namely, the inflow-side side rail portion 112 of the side rail 110, which is parallel to the longitudinal direction of the slider 100, mainly contributes to the compression of the air. Of course, the outflow-side side rail portion 114, inclined inwardly toward the centerline of the slider 100, also contributes to the compression of the air.

Then, consider the case where the absolute value of the yaw angle is large (for example, the yaw angle is −21°. A length Lb, indicated in a dots-and-dash line in FIG. 1, corresponds to the length of compression of the air by the side rail 110. Namely, the outflow-side side rail portion 114 of the side rail 110, which is inclined inwardly toward the centerline of the slider 100, mainly contributes to the compression of the air. Of course, the inflow-side side rail portion 112, which is parallel to the longitudinal direction of the slider 100, also contributes to the compression of the air, but its percentage of this contribution is low.

In the type of negative pressure flying head slider (as disclosed in Japanese Patent Unexamined Publication No. 7-169221) in which the disk outer periphery-side side rail merely extends in the longitudinal direction of the slider, a length Lc, indicated in a broken line in FIG. 1, corresponds to the length of compression of the air by the side rail. The larger the yaw angle becomes, the smaller the length Lc becomes. As a result, the flying height is reduced.

On the other hand, in this embodiment, there is provided the outflow-side side rail portion 114 which is inclined inwardly toward the centerline of the slider 100, and therefore even when the yaw angle increases, the sufficient length of compression of the air by the side rail is secured. Therefore, the flying height can be increased.

The angle θ1 of the outflow-side side rail portion 114 with respect to the inflow-side side rail portion 112 will be described. As described above, the maximum value of the absolute value of the yaw angle is 21°. If only the yaw angle is to be taken into consideration, it is only necessary to set the inclination angle θ1 to 21°. However, during the seeking, the air flow traverses the side rails at an angle larger than the yaw angle. Therefore, in order to secure the length of compression of the air by the side rail during the seeking, the inclination angle θ1 needs to be more than the yaw angle. On the other hand, the maximum value of the inclination angle θ1 of the outflow-side side rail portion 114 is less than 90° since there is a physical limit to the provision of the inclined side rail portion. Namely, the inclination angle θ1 of the outflow-side side rail portion 114 with respect to the inflow-side side rail portion 112 is more than the maximum value of the yaw angle, and is less than 90°.

And besides, in order to obtain the sufficient length of compression of the air when the yaw angle is around 0°, the inflow-side side rail portion 112, extending in the longitudinal direction of the slider 100, needs to have a certain degree of length. Further, in order to obtain the sufficient length of compression of the air when the yaw angle increases, the outflow-side side rail portion 114 needs to have a certain degree of length. In view of these, the inflow-side side rail portion 112 and the outflow-side side rail portion 114 have substantially the same length.

Under these conditions, in the magnetic disk device in which the maximum value of the absolute value of the yaw angle is 21°, it is preferred that the inclination angle θ1 should be not less than 25°. The slider 100 has such a small size that its overall length L is 1.25 mm and that its overall width W is 1 mm, and therefore if the inclination angle θ1 is too large, the distal end of the side rail 110 and the distal end of the side rail 120 are interconnected, so that the outflow portion, through which the air flows from the recess 180, cannot be provided. From this dimensional limitation, it is preferred that the inclination angle θ1 should be less than 55°.

The above description has been made with respect to the slider used in the magnetic disk device 200 in which the yaw angle varies in the negative value range from about −2° to about −21°. However, the inclination angle can be determined similarly even if the yaw angle varies in the range from a negative value to a positive value (for example, from +2° to −18°) or even if the yaw angle varies in the positive value range.

Figure 5:
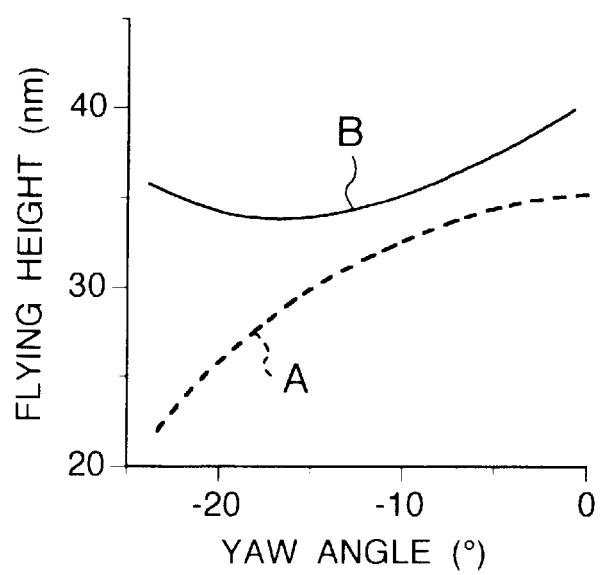
FIG. 5 is a graph showing simulation results representing the relation between a yaw angle and a flying height of the slider of the first embodiment, as well as the relation between a yaw angle and a flying height of a conventional negative pressure flying head slider.

FIG. 5 shows simulation results representing the relation between the flying height and the yaw angle of the negative pressure flying head slider of this embodiment, as well as the relation between the flying height and the yaw angle of a conventional negative pressure flying head slider.

A broken line A represents the relation between the flying height and the yaw angle of the conventional negative pressure flying head slider. In this conventional negative pressure flying head slider, a pair of side rails, formed respectively at opposite side portions of the slider, are parallel to a longitudinal direction of the slider, and extend at their distal ends to an air outflow end of the slider. The conventional negative pressure flying head slider exhibits the characteristics that, as the absolute value of the yaw angle increases, the flying height decreases.

A solid line B represents the relation between the flying height and the yaw angle of the negative pressure flying head slider of this embodiment. In a region where the absolute value of the yaw angle is small, the flying height of the negative pressure flying head slider of this embodiment is slightly higher than that of the conventional negative pressure flying head slider. The slider of this embodiment exhibits the characteristics that, as the absolute value of the yaw angle increases, the reduction of the flying height is less than that of the conventional negative pressure flying head slider, and that when the absolute value of the yaw angle becomes larger than 18°, the flying height increases.

As described above, in this embodiment, the side rails, formed on the slider, extend to the air outflow end Eout of the slider, and therefore the lubricant will not be accumulated on that portion (where the side rails are not present) to the rear of the side rails, and the force of adhesion between the slider and the magnetic disk can be reduced.

One side rail is constituted by the inflow-side side rail portion parallel to the longitudinal direction of the slider, and the outflow-side side rail portion inclined inwardly toward the centerline of the slider, and therefore even when the absolute value of the yaw angle increases, the required flying height can be obtained.

The flying height can be made as small as several tens of nm, and therefore the high-density recording can be achieved in the magnetic disk device.

Figure 6:
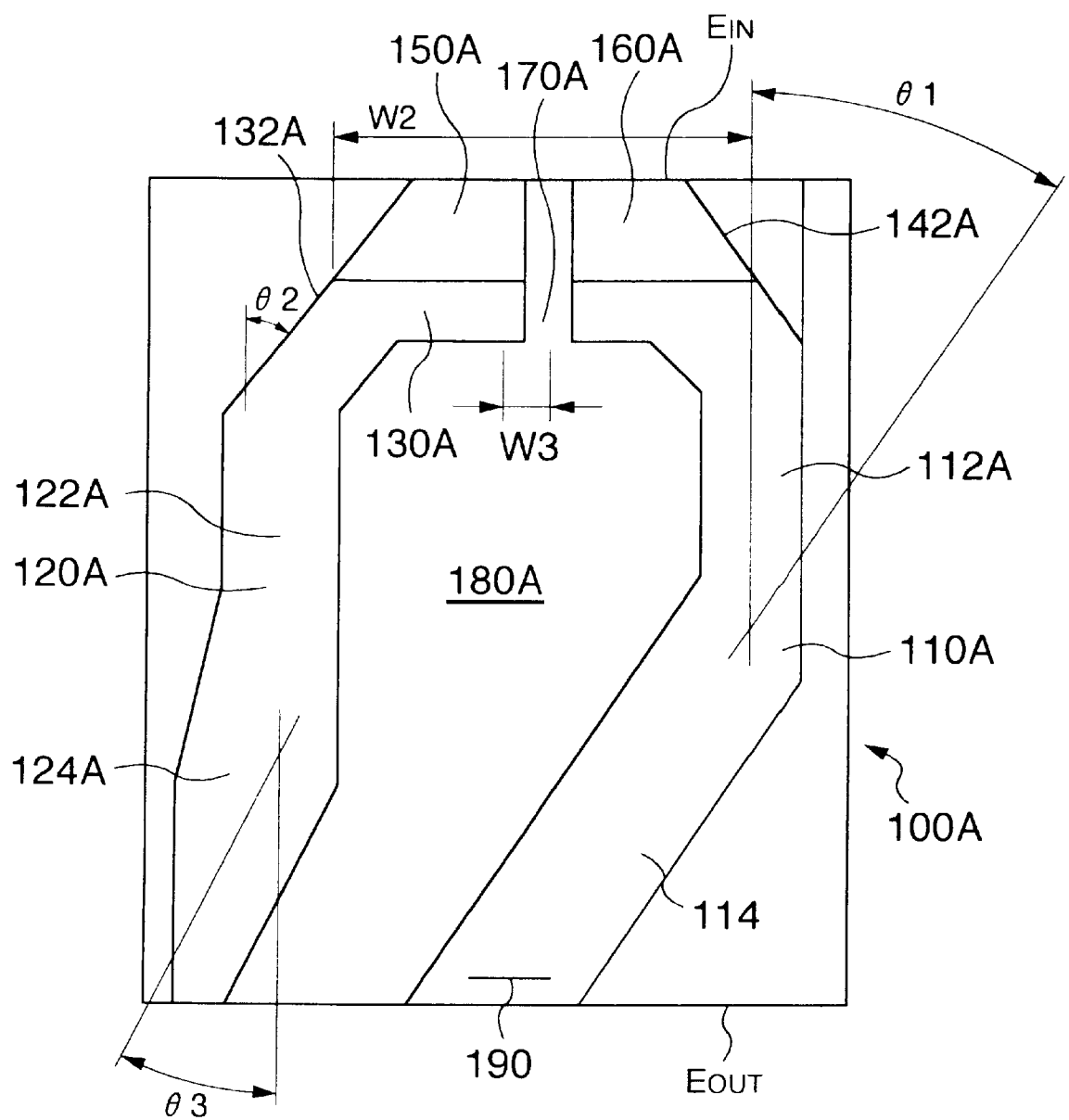
FIG. 6 is a plan view of a second embodiment of a negative pressure flying head slider of the invention, showing an air bearing surface.

Next, a second embodiment of a negative pressure flying head slider of the invention will be described with reference to FIGS. 6 to 8.

The negative pressure flying head slider 100A of the second embodiment is also used in the magnetic disk device 200 in which the yaw angle, shown in FIG. 3, varies in the range from about −2° to about −21° as in the first embodiment.

In the magnetic disk device, the yaw angle, formed between the direction of flow of the air into the slider in the circumferential direction of the magnetic disk and the longitudinal direction of the slider, varies in accordance with the swinging motion of the rotary actuator, and therefore the yaw angle differs in value between inner periphery-side tracks and outer periphery-side tracks of the magnetic disk. At the same time, the peripheral speed is different between the inner periphery-side tracks and outer periphery-side tracks of the magnetic disk, so that the flow velocity of the air differs. Namely, the peripheral speed is higher at the outer peripheral portion, and the peripheral speed decreases progressively toward the inner periphery. As a result, there is a tendency that the flying height is reduced at the inner periphery portion.

Therefore, in the second embodiment, the flying height is further reduced, and the difference between the maximum value and the minimum value of the flying height is reduced, as compared with the negative pressure flying head slider of FIG. 1. Only the differences from the first embodiment will be described below.

In this embodiment, a width W2 of an air introducing portion 150A is smaller as compared with the first embodiment of FIG. 1. With this construction, the flying height is small as compared with the first embodiment of FIG. 1. The reduction of the flying height due to the decrease of the width of the air introducing portion 150A is conspicuous particularly in that region where the absolute value of the yaw angle is large.

A slit 170A is offset a distance W3 from a central position of the slider 100A (in the direction of the width of the slider 100A) toward the outer periphery of the magnetic disk. The distance W3 is about 0.1 mm. By thus offsetting the slit 170A from the widthwise central position of the slider 100A toward the outer periphery of the magnetic disk, an unbalance of the flying height in a rolling direction of the slider 100A is reduced.

In accordance with the reduced width of the air introducing portion 150A, a side surface, extending from the proximal end of the air introducing portion 150A to a aside rail 110A via a cross rail 130A is formed into an inclined surface 142A, and similarly a side surface, extending the proximal end of the air introducing portion 150A to a side rail 120A via the cross rail 130A, is formed into an inclined surface 132A. These inclined surfaces are provided in order to cause the air to smoothly flow the outer sides of the rails. The angle θ2 of inclination of the inclined surfaces 132A and 142A with respect to the longitudinal direction of the slider 100A is 35°.

The side rail 120A comprises an inflow-side side rail portion 122A which is disposed at an air inflow end-side of the slider 100A, and is parallel to the longitudinal direction of the slider 100A, and an outflow-side side rail portion 124A which is disposed at an air outflow end-side of the slider 100A, and is inclined outwardly away from the centerline of the slider 100A. The angle θ3 of inclination of the outflow-side side rail portion 124A with respect to the longitudinal direction of the slider 100A is 25°.

Figure 7:
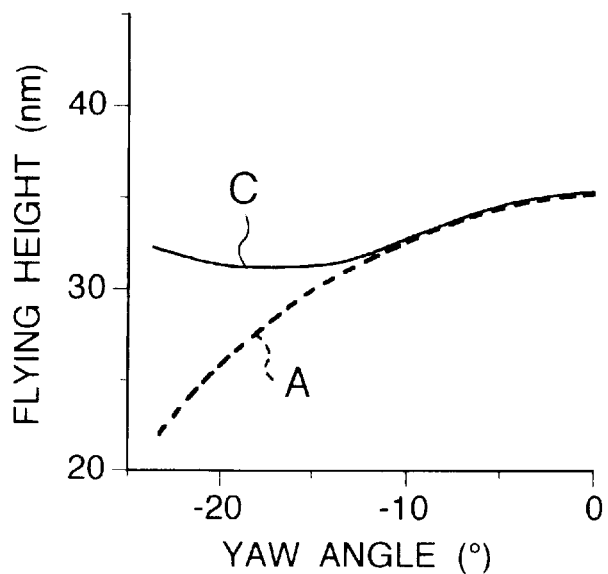
FIG. 7 is a graph showing simulation results representing the relation between a yaw angle and a flying height of the slider of the second embodiment, as well as the relation between a yaw angle and a flying height of the conventional negative pressure flying head slider.

FIG. 7 shows simulation results representing the relation between the flying height and the yaw angle of the negative pressure flying head slider of this embodiment, as well as the relation between the flying height and the yaw angle of the conventional negative pressure flying head slider used in the simulation of FIG. 5.

A broken line A represents the relation between the flying height and the yaw angle of the conventional negative pressure flying head slider, and is equal to the broken line A in FIG. 5.

A solid line C represents the relation between the flying height and the yaw of the negative pressure flying head slider of the second embodiment. The absolute value of the yaw angle is smaller by comparison with that of the first embodiment indicated in the solid line B in FIG. 5. This is attributable to the fact that the width of the air introducing portion 150 is reduced. This slider of this embodiment exhibits characteristics that as the absolute value of the yaw angle increases, the reduction of the flying height is less than that of the conventional negative pressure flying head slider, and that when the absolute value of the yaw angle becomes larger than about 18°, the flying height increases.

Figure 8:
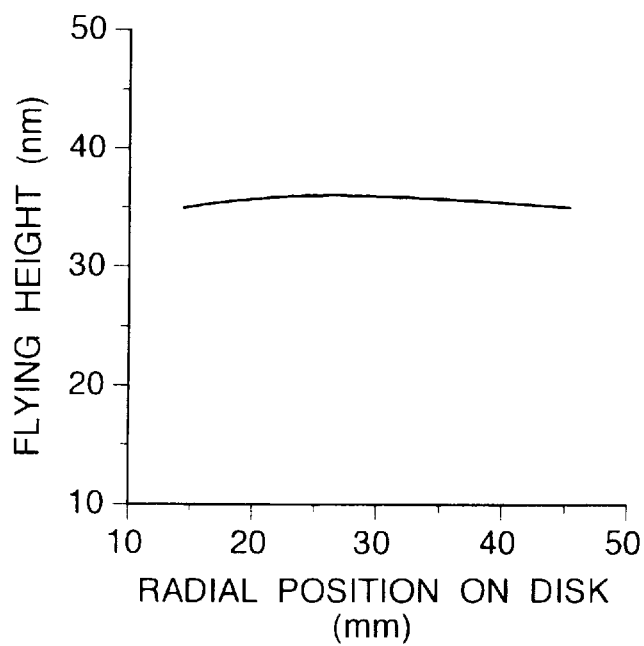
FIG. 8 is a graph showing simulation results representing the relation between a radial position of the slider of the second embodiment on a magnetic disk and a flying height thereof.

FIG. 8 shows simulation results representing the relation between the flying height of the negative pressure flying head slider of the second embodiment and a radial position of the slider on the magnetic disk.

As will be appreciated from FIG. 8, the flying height of the slider is generally constant regardless of the radial position of the slider on the disk. The reason for this is that even if the flow velocity of the air is lowered at the inner periphery-side of the disk, the length of compression of the air is secured by the outflow-side side rail portion 124A of the side rail 120 located at the inner periphery-side of the disk.

When the negative pressure flying head slider of the second embodiment is used in the magnetic disk device 200 in which the yaw angle varies in the range of from −2° to −21°, the change of the flying height of the slider 100A in accordance with the change of the peripheral speed and the change of the yaw angle can be reduced. The difference between the maximum and minimum values of the flying height is generally constant (i.e., about 2 nm) regardless of the radial position of the slider on the magnetic disk 220.

Figure 9:
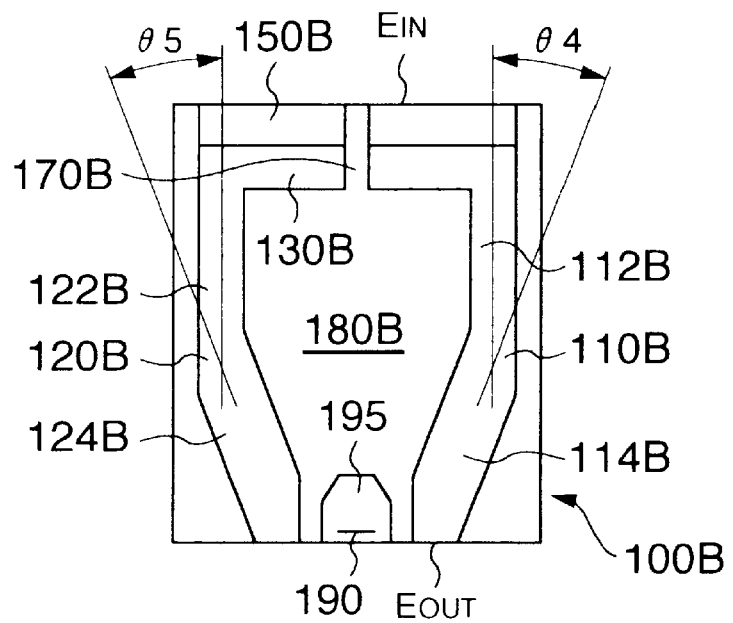
FIG. 9 is a plan view of a third embodiment of a negative pressure flying head slider of the invention, showing an air bearing surface.

Next, a third embodiment of a negative pressure flying head slider of the invention will be described with reference to FIGS. 9 to 11.

Figure 10:
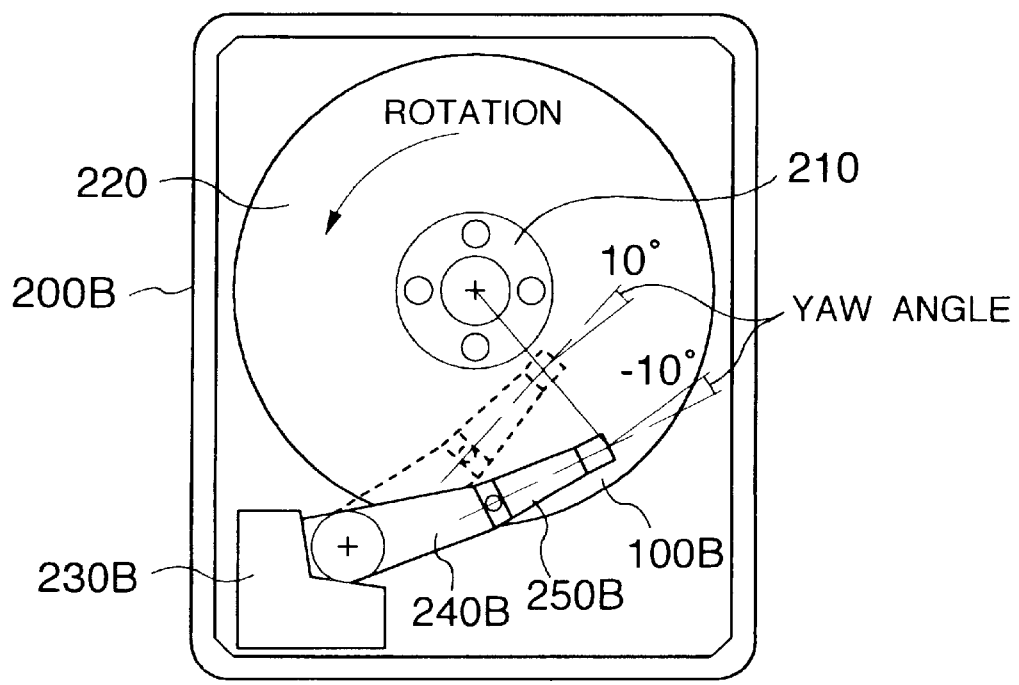
FIG. 10 is a schematic plan view of a magnetic disk device in which the slider of the third embodiment is mounted.

The slider of this embodiment is used in a magnetic disk device 200B in which a yaw angle, shown in FIG. 10, varies in the range from −10° to +10°. Only the differences from the first and second embodiments will be described below.

A side rail 110B, located at an outer periphery-side of a disk, comprises an inflow-side side rail portion 112B which is disposed at an air inflow end-side of the slider 100B, and extends in a longitudinal direction of the slider 100B, and an outflow-side side rail portion 114B which is disposed at an air outflow end-side of the slider 100B, and is inclined inwardly toward the centerline of the slider 100B. A side rail 120B, located at an inner periphery-side of the disk, comprises an inflow-side side rail portion 122B which is disposed at the air inflow end-side of the slider 100B, and extends in the longitudinal direction of the slider 100B, and an outflow-side side rail portion 124B which is disposed at the air outflow end-side of the slider 100B, and is inclined inwardly toward the centerline of the slider 100B.

In order to obtain the length of compression of the air, the angle θ4, θ5 of inclination of each of the outflow-side side rail portions 114B and 124B with respect to the longitudinal direction of the slider 100B needs to be larger than the maximum value of the absolute value of the yaw angle, as described above. In this embodiment, the maximum value of the absolute value of the yaw angle is 10°, and therefore the inclination angles θ4 and 5 need to be larger than 10°. In this third embodiment, an absolute value of the angle θ4 of inclination of the outflow-side side rail portion 114B with respect to the longitudinal direction of the slider is set to 20°, and an absolute value of the angle θ5 of inclination of the outflow-side side rail portion 124B with respect to the longitudinal direction of the slider is also set to 20°.

A center rail 195 is formed in an island-like manner between the outflow-side side rail portions 114B and 124B. A magnetic transducer 190 is provided in the center rail 195.

Figure 11:
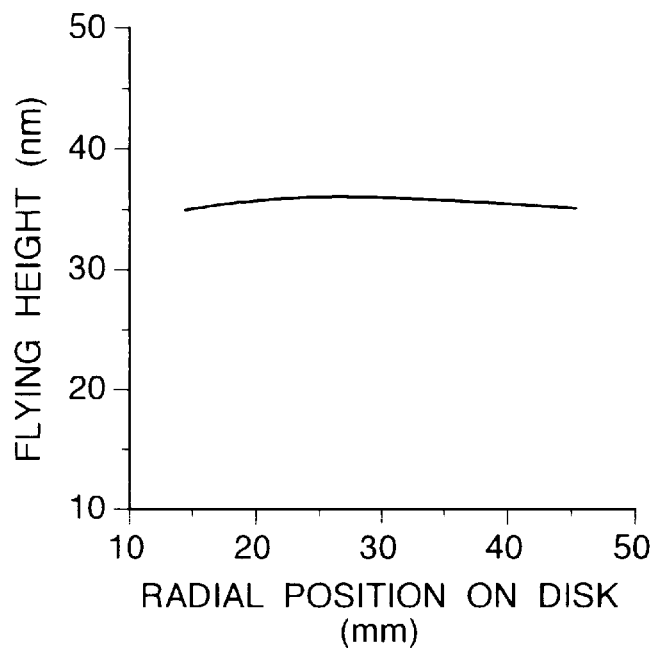
FIG. 11 is a graph showing simulation results representing the relation between a radial position of the slider of the third embodiment on a magnetic disk and a flying height thereof.

FIG. 11 shows simulation results representing the relation between a flying height of the slider 100B of the third embodiment, mounted in the magnetic disk device 200B, and a radial position of the slider on the disk. As will be appreciated from FIG. 11, the flying height of the slider 100B is generally constant regardless of the radial position of the slider on the magnetic disk. The reason for this is that the length of compression of the air is secured by the outflow-side side rail portion 114B of the outer periphery-side side rail 110B when the yaw angle is −10° whereas the length of compression of the air is secured by the outflow-side side rail portion 124b of the inner periphery-side side rail 120B when the yaw angle is 10°. Further, since the inclination angles θ4 and θ5 are larger than the absolute value of the yaw angle, the length of compression of the air by the side rails is secured even during the seeking, thereby preventing the flying height from being reduced.

Figure 12:
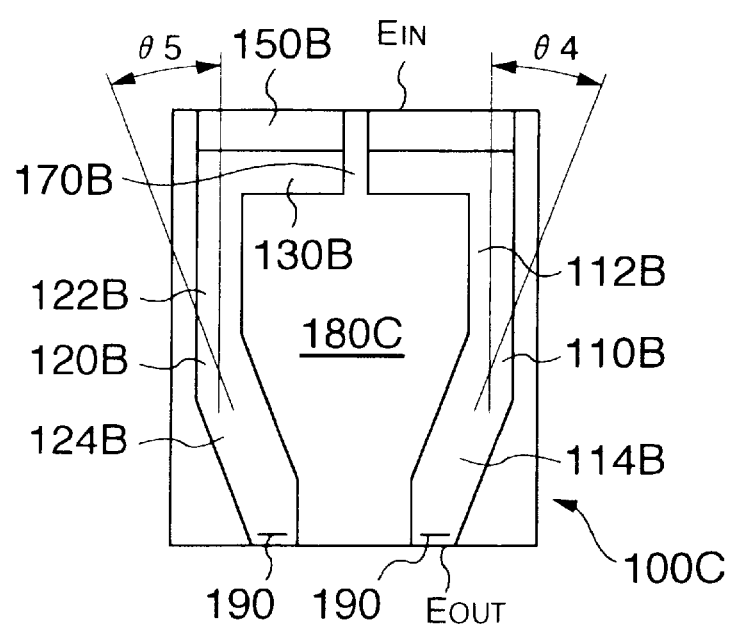
FIG. 12 is a plan view of a modified form of the third embodiment, showing an air bearing surface.

In the third embodiment, as in the first and second embodiments, the provision of the center rail 195 may be omitted as shown in FIG. 12, and the magnetic transducer 190 may be provided at the rear end of one of the two side rails. As another alternative, magnetic transducers 190 may be provided respectively at the rear ends of the two side rails.

As described above, in the negative pressure flying head sliders of the present invention, the pair of side rails extend over the entire length of the slider, and therefore even when the slider is operated with a low flying height, the lubricant, coated on the surface of the magnetic disk will not be accumulated on the air bearing surface of the slider. Therefore, the adhesion force between the slider and the magnetic disk will not increase. Further, in the negative pressure flying head sliders of the invention, at least one of the pair of side rails includes the inflow-side side rail portion which is disposed at the air inflow end-side of the slider, and extends in the longitudinal direction of the slider, and the outflow-side side rail portion which is disposed at the air outflow end-side of the slider, and extends in the direction of the yaw angle, and the angle of the outflow-side side rail portion with respect to the inflow-side side rail portion is greater than the yaw angle. With this construction, the reduction of the flying height of the slider upon formation of the yaw angle and during the seeking is less. Therefore, the negative pressure flying head sliders of the present invention can be used with the low flying height. Further, the magnetic disk device, using the negative pressure flying head slider of the invention, can achieve a high recording density.

What is claimed is:

1. A negative pressure flying head slider comprising:
   an air bearing surface of a substantially rectangular shape to be disposed in opposed relation to a rotating magnetic disk;
   an air inflow end;
   an air outflow end;
   an air introducing portion formed on said air bearing surface in immediately adjacent relation to said air inflow end;
   a cross rail formed on said air bearing surface in continuous relation to said air introducing portion, said cross rail extending in a direction of a width of said slider;
   a pair of side rails formed on said air bearing surface, and extending respectively from opposite ends of said cross rail to said air outflow end in a longitudinal direction of said slider, one of said pair of side rails being located at an outer periphery-side of the magnetic disk when said slider is mounted on a magnetic disk device, said one side rail having an inflow-side side rail portion which extends generally parallel to long sides in the longitudinal direction of said slider, and an outflow-side side rail portion which is disposed toward an air outflow end-side of said slider with respect to said inflow-side side rail portion, and which has inner and outer edges that extend in parallel with each other toward a midpoint of said air outflow-end side;
   a recess defined by said cross rail and said pair of side rails;
   a slit formed in said cross rail to permit the recess to communicate with said air inflow end; and
   a magnetic transducer provided at that portion of said slider disposed in the vicinity of said air outflow end.

2. A slider according to claim 1, in which the other of said pair of side rails is located at an inner periphery-side of the magnetic disk when said slider is mounted on the magnetic disk device, and said other side rail has an inflow-side side rail portion which extends generally parallel to the long sides in the longitudinal direction of said slider, and an outflow-side side rail portion which is disposed toward the air outflow end-side of said slider with respect to said inflow-side side rail portion of said other rail, and extends at an angle other than 0° with respect to said long sides.

3. A slider according to claim 2, in which said outflow-side side rail portion of said one side rail and said outflow-side side rail portion of said other side rail extend substantially in the same direction.

4. A slider according to claim 3, in which the angle of said parallel inner and outer edges of said outflow-side side rail portion of said one side rail with respect to said inflow-side side rail portion thereof is different from the angle of said outflow-side side rail portion of said other side rail with respect to said inflow-side side rail portion thereof.

5. A slider according to claim 2, in which said outflow-side side rail portion of said one side rail and said outflow-side side rail portion of said other side rail extend in such a manner that they approach each other progressively toward said air outflow end.

6. A slider according to claim 5, in which an absolute value of the angle of said parallel inner and outer edges of said outflow-side side rail portion of said one side rail with respect to said inflow-side side rail portion thereof is substantially the same as an absolute value of the angle of said outflow-side side rail portion of said other side rail with respect to said inflow-side side rail portion thereof.

7. A slider according to claim 1, in which said inflow-side side rail portion and said outflow-side side rail portion are substantially equal in length to each other.

8. A slider according to claim 1, in which said slit is provided in a central portion of said slider in a direction of the width of said slider.

9. A slider according to claim 1, in which said slit is offset from a central portion of said slider in a direction of the width of said slider.

10. A slider according to claim 1, in which side surfaces, extending from a proximal end of said air introducing portion respectively to said pair of side rails via said cross rail are inclined with respect to the longitudinal direction of said slider.

11. A slider according to claim 1, in which said air introducing portion is defined by a slanting surface slanting in a direction of a thickness of said slider.

12. A slider according to claim 1, in which said air introducing portion is defined by a stepped surface stepped in a direction of a thickness of said slider.

13. A magnetic disk device comprising:
   a rotatable spindle for rotating a magnetic disk; and
   a rotary actuator comprising a pivotally-movable carriage, a suspension mounted on a distal end of said carriage, and a negative pressure flying head slider as defined in claim 1.

14. A magnetic disk device according to claim 13, wherein the outflow-side side rail portion having parallel inner and outer edges extends in a direction of a yaw angle defined as the angle between air flow direction due to rotation of the rotating magnetic disk and the longitudinal direction of the slider, and wherein an angle of said outflow-side side rail portion with respect to said inflow-side side rail portion is greater than a maximum value of an absolute value of the yaw angle and less than 90°.

15. A magnetic disk device according to claim 14, in which the other of said pair of side rails is located at an inner periphery-side of the magnetic disk when said slider is mounted on the magnetic disk device, and in which said other side rail has an inflow-side side rail portion which extends generally parallel to the long sides in the longitudinal direction of said slider, and an outflow-side side rail portion which is disposed toward the air outflow end-side of said slider with respect to said inflow-side side rail portion of said other rail, and extends in the direction of the yaw angle, wherein an angle of said outflow-side side rail portion of said other side rail with respect to said inflow-side side rail portion thereof is greater than the maximum value of the absolute value of the yaw angle and less than 90°.

16. A slider according to claim 13, wherein the inflow-side side rail portion and the outflow-side side rail portion form an inclination angle $\theta_1 > 21°$ in absolute value therebetween.

17. A slider according to claim 16, wherein the absolute value of the inclination angle between the inflow-side side rail portion and the outflow-side side rail portion is at least 25° and less than 55°.

18. A slider according to claim 1, wherein the inflow-side side rail portion and the outflow-side side rail portion form an inclination angle $\theta_1 > 21°$ in absolute value therebetween.

19. A slider according to claim 18, wherein the absolute value of inclination angle between the inflow-side side rail portion and the outflow-side side rail portion is at least 25° and less than 55°.

20. A slider according to claim 1, wherein the outflow-side side rail portion having parallel inner and outer edges extends in a direction of a yaw angle defined as the angle between air flow direction due to rotation of the rotating magnetic disk and the longitudinal direction of the slider, and wherein an angle of said outflow-side side rail portion with respect to said inflow-side side rail portion is greater than a maximum value of an absolute value of the yaw angle and less than 90°.

21. A slider according to claim 20, in which the other of said pair of side rails is located at an inner periphery-side of the magnetic disk when said slider is mounted on the magnetic disk device, and in which said other side rail has an inflow-side side rail portion which extends generally parallel to the long sides in the longitudinal direction of said slider, and an outflow-side side rail portion which is disposed toward the air outflow end-side of said slider with respect to said inflow-side side rail portion of said other rail, and extends in the direction of the yaw angle, wherein an angle of said outflow-side side rail portion of said other side rail with respect to said inflow-side side rail portion thereof is greater than the maximum value of the absolute value of the yaw angle and less than 90°.

* * * * *